United States Patent
Stone et al.

(10) Patent No.: US 12,425,543 B2
(45) Date of Patent: Sep. 23, 2025

(54) CLIENT DEVICES, SERVER, AND METHODS

(71) Applicants: SONY GROUP CORPORATION, Tokyo (JP); SONY EUROPE B.V., Weybridge (GB)

(72) Inventors: Jonathan James Stone, Berkshire (GB); Nicolas Pierre Rose, Basingstoke (GB)

(73) Assignee: Sony Group Corporation, Tokyo (JP)

( * ) Notice: Subject to any disclaimer, the term of this patent is extended or adjusted under 35 U.S.C. 154(b) by 245 days.

(21) Appl. No.: 18/027,481

(22) PCT Filed: Sep. 29, 2021

(86) PCT No.: PCT/GB2021/052527
§ 371 (c)(1),
(2) Date: Mar. 21, 2023

(87) PCT Pub. No.: WO2022/069887
PCT Pub. Date: Apr. 7, 2022

(65) Prior Publication Data
US 2023/0379426 A1  Nov. 23, 2023

(30) Foreign Application Priority Data
Oct. 2, 2020 (GB) .................................... 2015673

(51) Int. Cl.
*H04N 7/15* (2006.01)
*G06T 7/194* (2017.01)
(Continued)

(52) U.S. Cl.
CPC .............. *H04N 7/15* (2013.01); *G06T 7/194* (2017.01); *H04N 5/272* (2013.01); *H04N 7/147* (2013.01);
(Continued)

(58) Field of Classification Search
None
See application file for complete search history.

(56) References Cited

U.S. PATENT DOCUMENTS 6,912,313 B2 *  6/2005  Li .................... H04N 1/3871
                                                  348/586
9,900,555 B1    2/2018  Barreto
(Continued)

FOREIGN PATENT DOCUMENTS

WO    2010002925 A2    1/2010

OTHER PUBLICATIONS

Jared Spataro: "Reimagining virtual collaboration for the future of work and learning", https://www.microsoft.com/en-us/microsoft-365/blog/2020/07/08/reimagining-virtual-collaboration-future-work-learning, Microsoft Corporation, Jul. 8, 2020.
(Continued)

*Primary Examiner* — Quoc D Tran
(74) *Attorney, Agent, or Firm* — Tucker Ellis LLP

(57) ABSTRACT

A method of receiving a live videoconference stream from a server is provided. The live videoconference stream comprises a plurality of participants each receiving the live videoconference stream using a client device. The method comprises receiving, by a client device of a first participant of the plurality of participants via the server, a foreground image from the client devices of at least some of the other participants, and outputting for display, by the client device of the first participant, the foreground images from the at least some of the other participants overlaid on a common background image in accordance with a position mapping received from a client device of an organiser of the live videoconference stream via the server. The position mapping is for distribution via the server to the client devices of all of the plurality of participants.

19 Claims, 10 Drawing Sheets

(51) Int. Cl.
    *H04N 5/272*     (2006.01)
    *H04N 7/14*     (2006.01)

(52) U.S. Cl.
    CPC ... *H04N 7/157* (2013.01); *G06T 2207/20021* (2013.01)

(56) References Cited

U.S. PATENT DOCUMENTS

| | | | |
|---|---|---|---|
| 11,295,511 B1* | 4/2022 | Yosifov | G06T 11/206 |
| 2008/0077953 A1* | 3/2008 | Fernandez | H04N 7/18 |
| | | | 725/32 |
| 2009/0033737 A1* | 2/2009 | Goose | H04N 7/15 |
| | | | 348/E7.083 |
| 2011/0102539 A1 | 5/2011 | Ferren | |
| 2011/0271209 A1 | 11/2011 | Jones | |
| 2012/0026277 A1 | 2/2012 | Malzbender | |
| 2012/0050323 A1* | 3/2012 | Baron, Jr. | H04L 12/1818 |
| | | | 345/632 |
| 2012/0056971 A1 | 3/2012 | Kumar | |
| 2016/0150187 A1 | 5/2016 | Fadili | |
| 2016/0353056 A1 | 12/2016 | Cullen | |
| 2017/0142371 A1* | 5/2017 | Barzuza | H04L 65/403 |
| 2021/0368112 A1* | 11/2021 | Gao | H04N 23/661 |

OTHER PUBLICATIONS

Takahiro Hayashi, et al.: "Development of video chat system based on space sharing and haptic communication", Sensors and Materials, vol. 30, No. 7 (2018) 1427-1435 1427MYU Tokyo https://myukk.org/SM2017/sm_pdf/SM1597.pdf, Apr. 25, 2018.

International Search Report and Written Opinion from corresponding International Application No. PCT/GB2021/052527, mailed on Dec. 21, 2021, 15 pages.

Search Report from corresponding GB Application No. 2015673.3, mailed on Mar. 31, 2021, 3 pages.

* cited by examiner

CLIENT DEVICES, SERVER, AND METHODS

BACKGROUND

Field of Disclosure

The present disclosure relates generally to videoconferencing, and specifically to videoconferencing techniques where participants are overlaid on a common background scene.

The present application claims the Paris Convention priority from United Kingdom Patent Application number 2015673.3, the contents of which are hereby incorporated by reference.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Video conferencing techniques are well known, and have become established means of holding meetings or seminars or the like between a plurality of participants, as a quick, cost-effective, and participant-friendly alternative to face-to-face meetings, negating the requirements for travel or usage of physical conference locations.

While improvements in computer hardware and wireless telecommunications services have been made over recent years, some issues still exist with known video conferencing techniques. In particular, participants do not typically enjoy the same feeling of togetherness and collaboration as they would during a conventional face-to-face conference or meeting.

SUMMARY OF THE DISCLOSURE

The present disclosure can help address or mitigate at least some of the issues discussed above.

Embodiments of the present technique can provide a method of receiving a live videoconference stream from a server. The live videoconference stream involves a plurality of participants each receiving the live videoconference stream using a client device. The method comprises receiving, by a client device of a first participant of the plurality of participants via the server, a foreground image from the client devices of at least some of the other participants, and outputting for display, by the client device of the first participant, the foreground images from the at least some of the other participants overlaid on a common background image in accordance with a position mapping received from a client device of an organiser of the live videoconference stream via the server. The position mapping is for distribution via the server to the client devices of all of the plurality of participants.

Embodiments of the present technique, which further relate to client devices for receiving videoconferences, methods and client devices for organising videoconferences, and server apparatus and methods for hosting videoconferences, as well as computer programs for causing computers to perform such methods of receiving, organising, and hosting videoconferences, allow for live videoconference calls in which all participants are placed onto a common background scene.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Video Conferencing

Videoconferencing, or video conferencing, techniques have been around for decades. In recent times, as both computer hardware and telecommunications services have improved and become more widespread, video conferencing has begun to replace traditional face-to-face meeting for a variety of purposes.

Home working, schooling, tuition, virtual meetings and conferences, and even video or voice calls over the Internet rather than traditional networks, have become widely adopted in recent times. Reasons for the adoption of such services at the cost of more traditional methods of communication involve a number of factors. Firstly, such videoconferencing or video telephony services are often far cheaper than their alternatives, especially compared to face-to-face meetings and conferences which require travel. They are also quicker and more environmentally friendly than traditional alternatives, and in recent times both with the increased awareness of climate change and the 2020 COVID-19 pandemic, demand has hugely increased for video conferencing services.

In typical videoconferencing systems and services, such as those provided by Zoom®, Microsoft Teams®, or Skype®, for example, multiple users upon joining are displayed somewhere in a row or array with other participants. Such users are typically displayed in their region of the screen in front of whatever background they happen to be located, though users can select their own custom backgrounds onto which their cropped or segmented faces and upper bodies are overlaid. This may lead to a lack of a feeling of togetherness of users, as well as an overall display which can be confusing or overwhelming due to the large number of difference objects, colours and disparate backgrounds being displayed.

Figure 1:
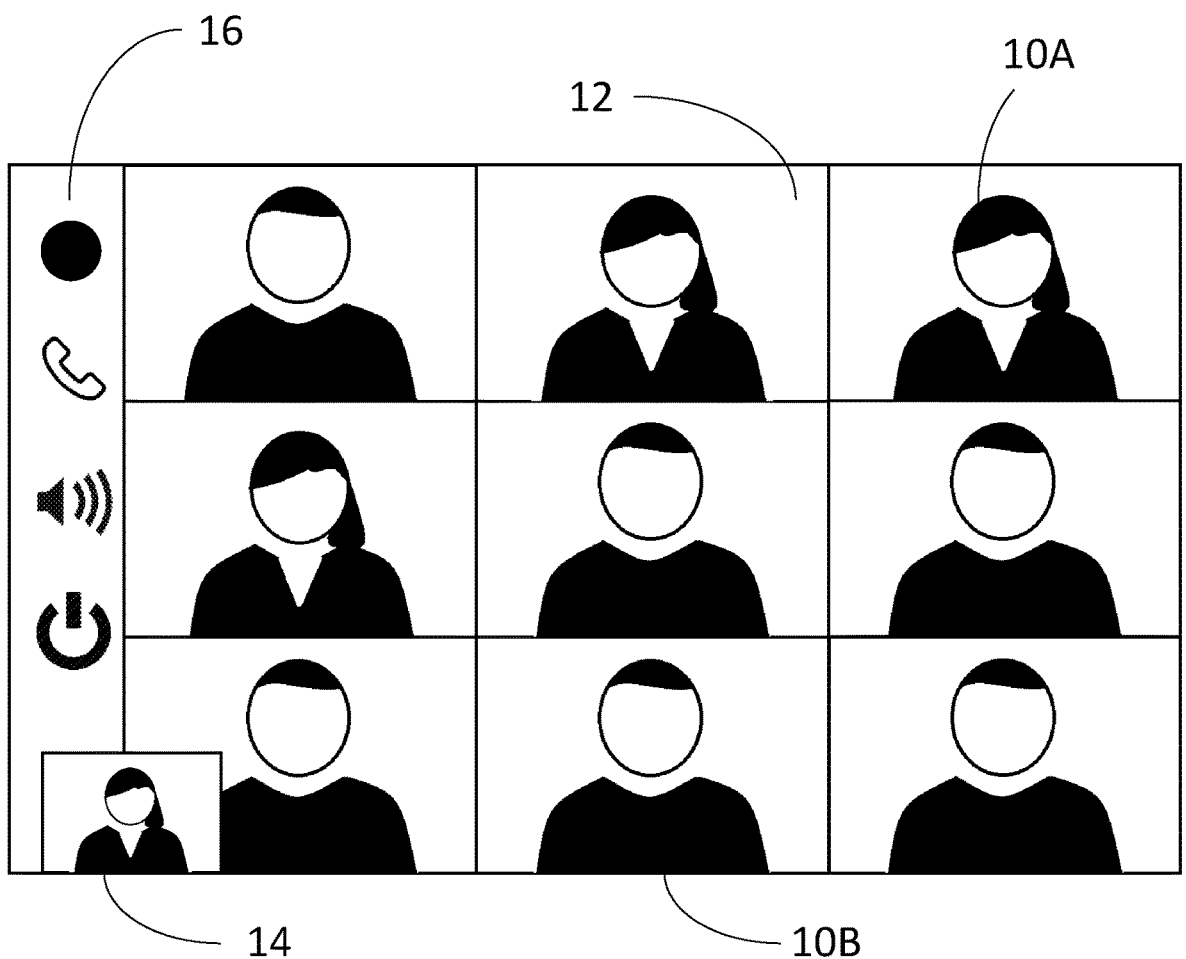
FIG. 1 illustrates an example of a conventionally known videoconferencing technique in which participants join with their own backgrounds.

FIG. 1 illustrates an example of a conventionally known videoconferencing technique between several participants. FIG. 1 illustrates the videoconference from the point of view of a first participants 14. As described above, users (including a second participant 10A and a third participant 10B) are displayed in an array; in this example, a 3×3 array, in equally-sized regions of the screen or display of the first user 14. In some video conferencing services, such as that illustrated by the example of FIG. 1, the screen may include a smaller region 14 showing the first participant. The screen of the example of FIG. 1 also includes a selection of option buttons 16 along the left-hand side, but those skilled in the art would appreciate that such option buttons may be displayed at any other location on the screen, including overlaid on some of the participants for the duration of a session or for a shorter period or alternatively may not be displayed on the screen at all during the video conference. Each of the users is displayed in front of their own backgrounds 12, which as described above may lead to users not feeling the same sense of togetherness or of a shared space as they would if the conference were held physically.

Video Conferencing with Common Backgrounds

In order to address such issues caused by users being displayed in front of their own individual backgrounds, it is possible to implement a common background shared by all participants of a video conference.

Figure 2A:
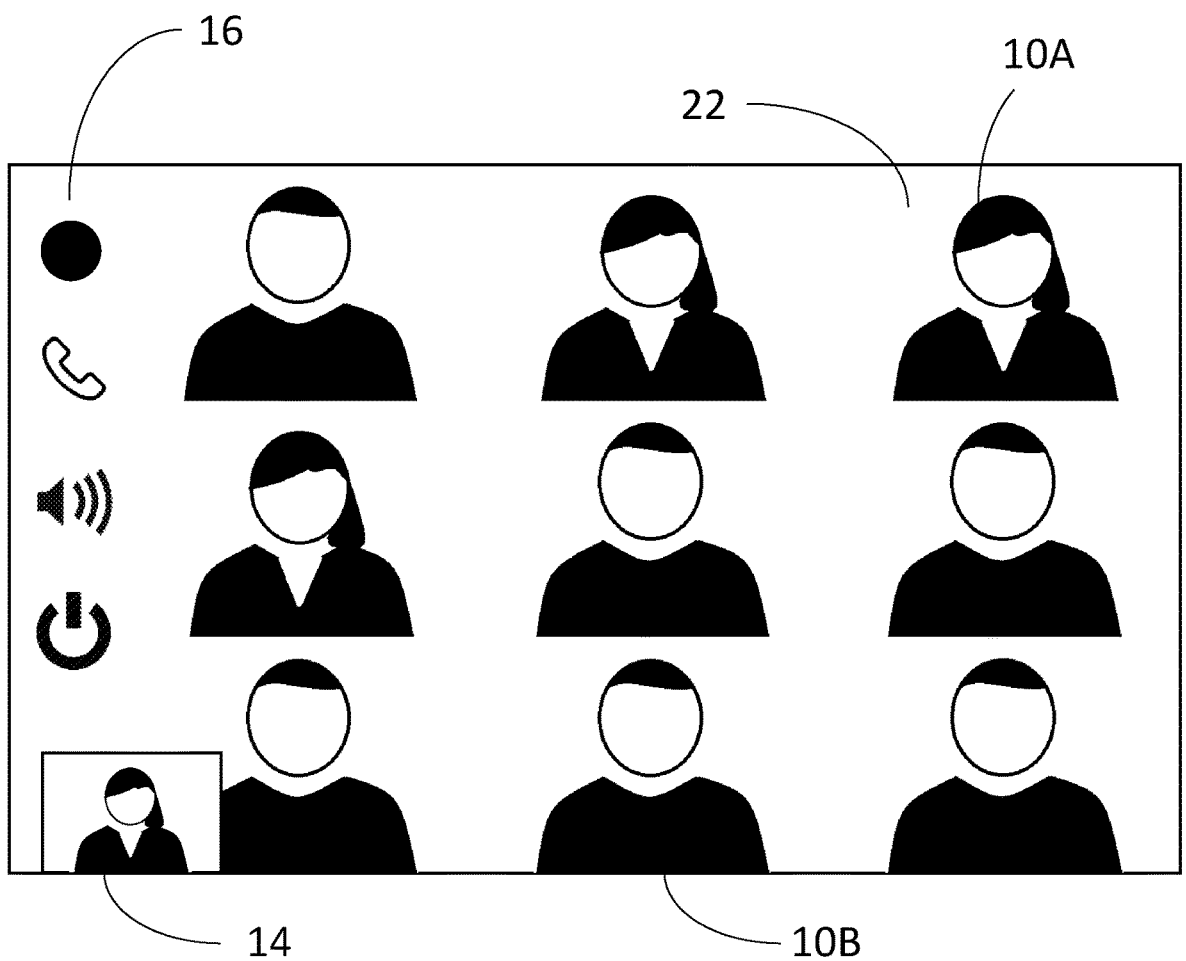
FIG. 2A illustrates a first example of a live videoconference call in which participants join over a common background scene in accordance with embodiments of the present technique.

FIG. 2A shows another example of a live videoconference call in accordance with embodiments of the present technique. The example of FIG. 2A corresponds broadly to that of FIG. 1, but here, instead of participants being displayed in front of their own backgrounds, they are displayed over a common background 22. Advantageously, this allows a greater feeling of shared space between users more akin to a physical conference.

However, issues still exist with video conferencing techniques utilising a common background, and the implementation of a common background itself is a challenge for video conferencing services and techniques. In particular, the manner in which participants are placed or organised with respect to the common background and to each other is something which is not adequately addressed by existing video conferencing techniques.

Figure 2B:
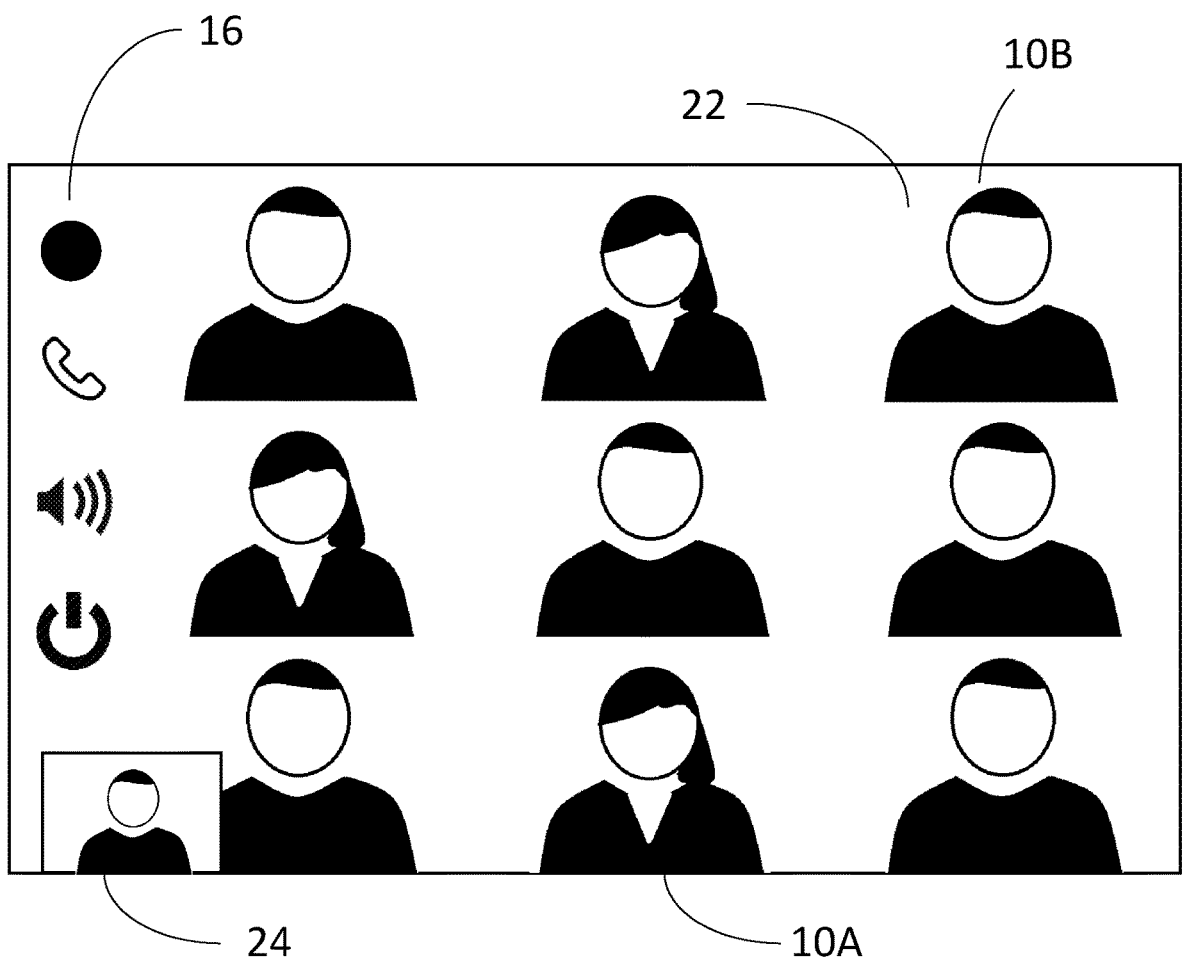
FIG. 2B illustrates a second example of a live videoconference call in which participants join over a common background scene in accordance with embodiments of the present technique.

FIG. 2B illustrates an example of a live videoconference call in accordance with embodiments of the present technique where such issues exist. Taking the example of FIG. 2A from the point of view of a first participant 14 of the video conference, FIG. 2B is an example of the same video conference from the point of view of a different participant 24. Here, as can be seen with the participants 10A and 10B, the order of display of users is not consistent between users. This is a typically experienced issue of commonly used video conferencing services, and is made more confusing for users to keep track of when participants are overlaid on a common background scene, as different users see different other users overlaid on different regions or parts of the common background.

Figure 2C:
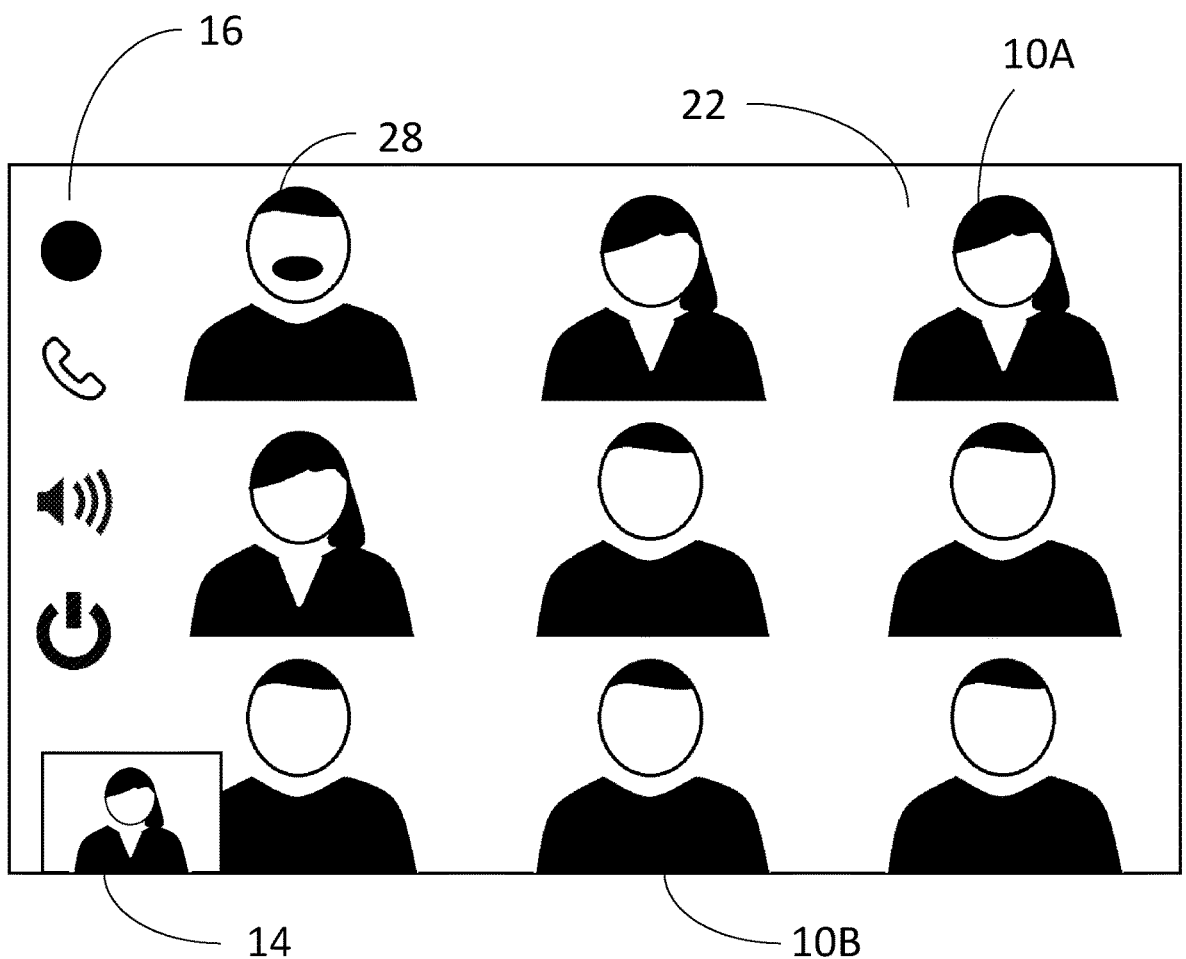
FIG. 2C illustrates a third example of a live videoconference call in which participants join over a common background scene in accordance with embodiments of the present technique.

Another issue experienced by users of live videoconference services, particularly in combination with the above-described issue of inconsistent participant placement as illustrated by the example of FIG. 2B, is that the primary speaker or host of a meeting is not always commonly (i.e. among all participants) placed centrally on the screen. This is a particular problem for users of smaller screens, such as those joining the video conference on a smart phone or the like, who may not be able to actually see the participant who is speaking. FIG. 2C shows an example of this issue. FIG. 2C illustrates another example of a live videoconference call which again corresponds to the example of FIG. 2A. Here, the speaker 28 is placed at the very top left of the screen—at least from the point of view of user 14—rather than at the centre of the screen where such a speaker 28 might be ideally placed.

Embodiments of the present disclosure discussed below seek to alleviate such issues relating to the use of common backgrounds and the placement of participants over such common backgrounds.

Mapping Video Conference Participants onto a Common Background

Figure 3:
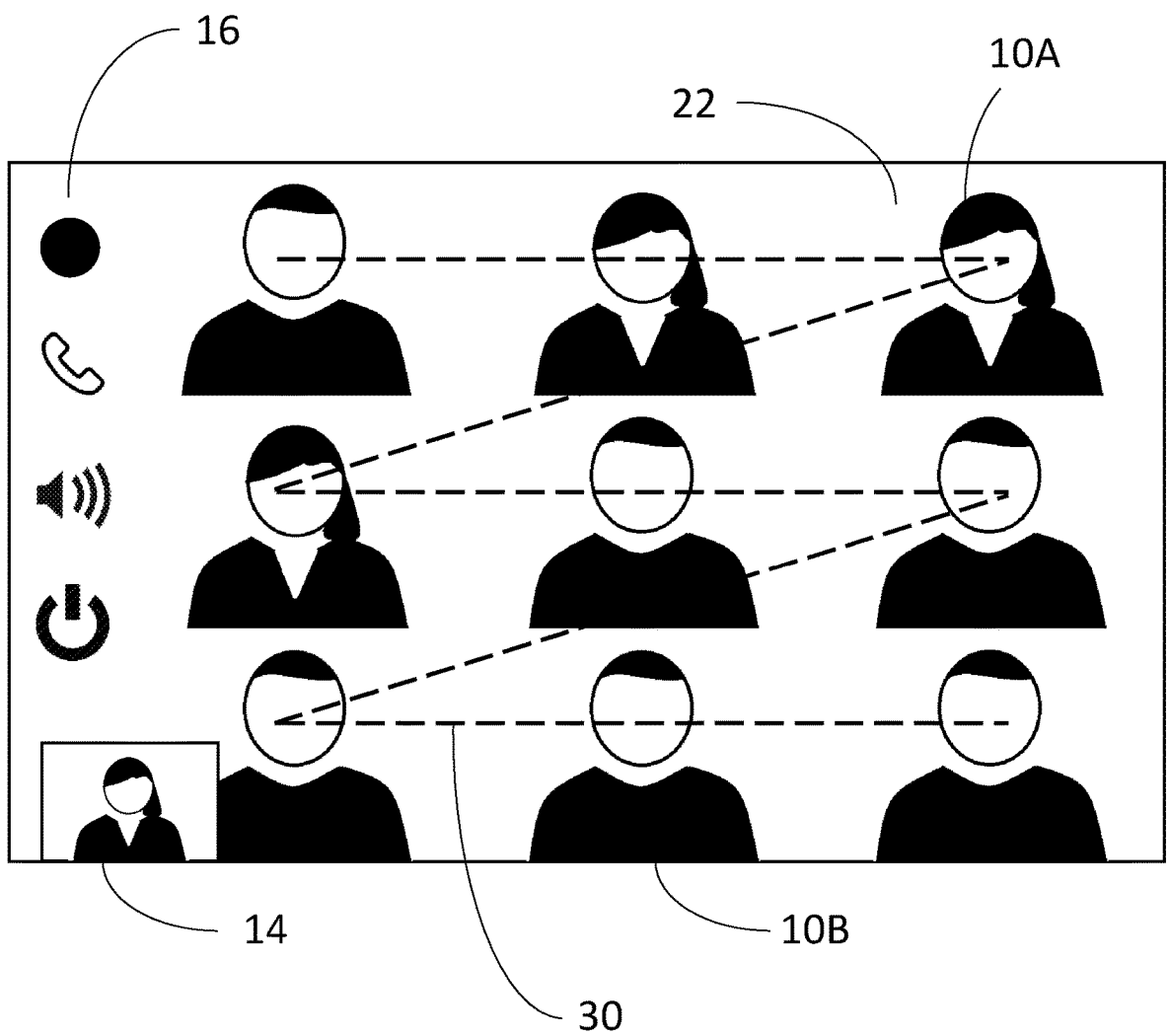
FIG. 3 illustrates a first example of a live videoconference stream in which participants are placed over a common background in an order based on a shared position mapping in accordance with embodiments of the present technique.

FIG. 3 illustrates a first example of a live videoconference stream in which participants are placed over a common background in an order based on a shared position mapping in accordance with embodiments of the present technique. Here, in the example of FIG. 3, the live videoconference stream involves a plurality of participants 10A, 10B, 14, where a first participant 14 is configured to receive a foreground image from each of the other participants 10A, 10B, and to present the foreground images from each of the other participants 10A, 10B overlaid on a common background image 22 in accordance with a position mapping 30 received from an organiser of the live videoconference stream. The position mapping 30 is the same position mapping for all of the plurality of participants 10A, 10B, 14 (i.e. it indicates to each participant the same association between positions on the background image and locations of foreground images), and the position mapping 30 is for distribution via the server to the client devices of all of the plurality of participants.

Figure 4:
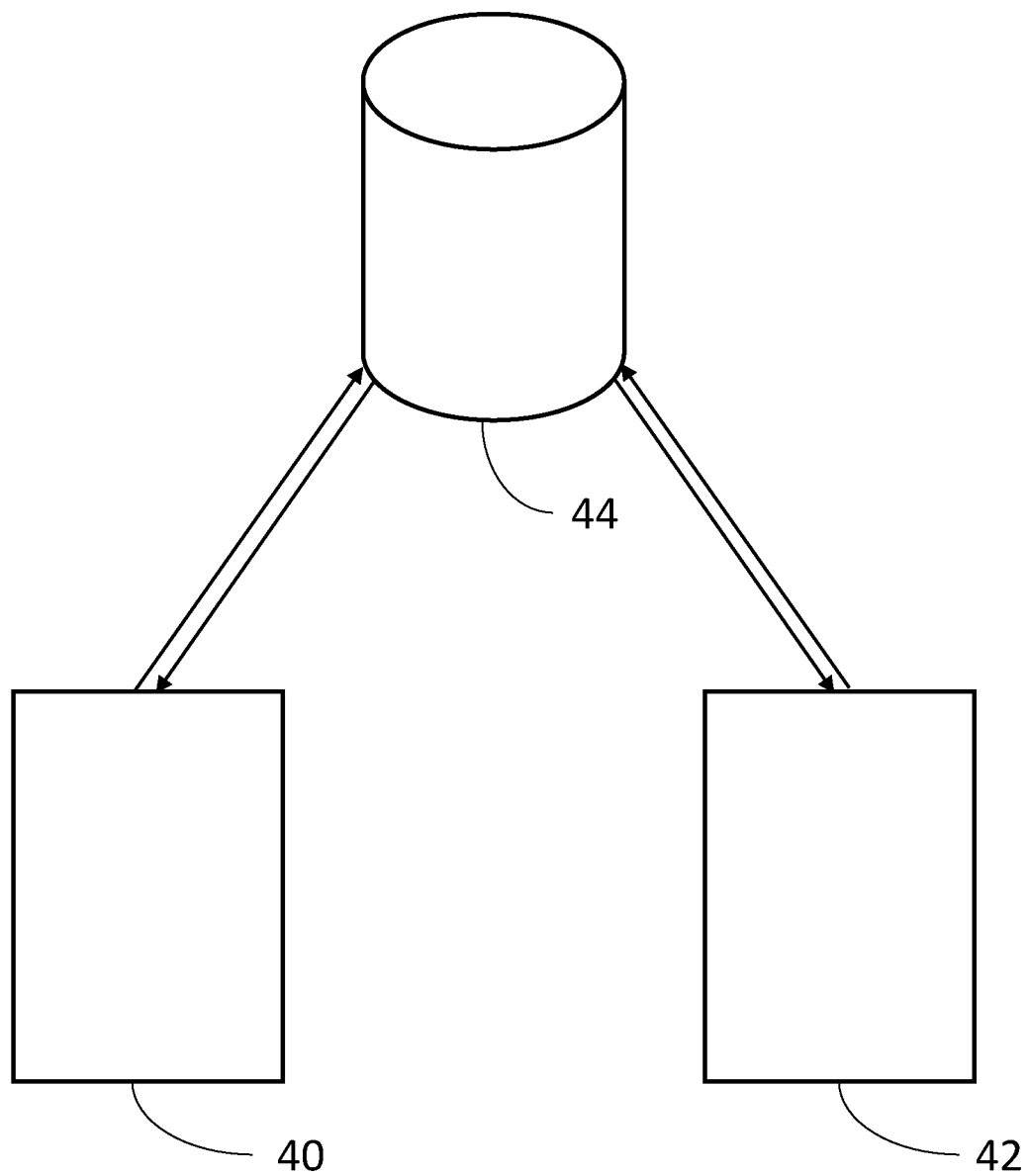
FIG. 4 shows an example of a videoconferencing system in accordance with embodiments of the present technique.
Figure 5:
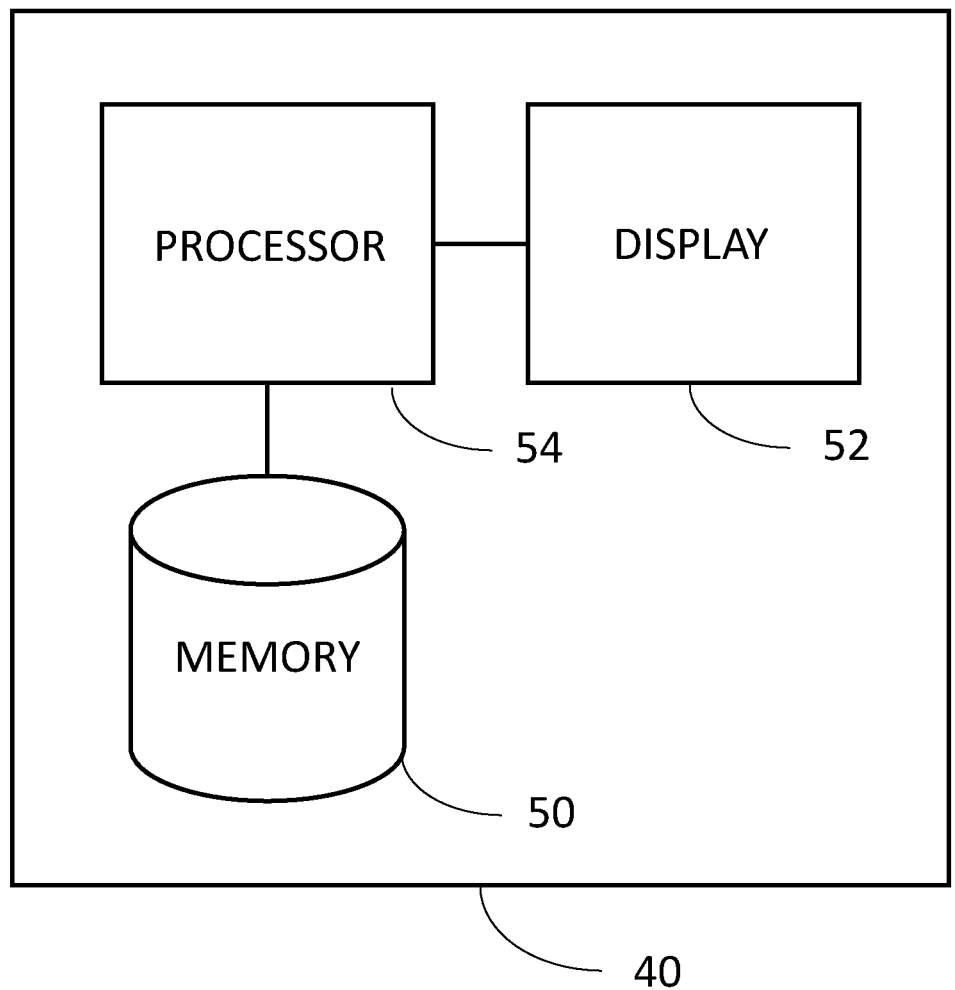
FIG. 5 shows an example of a client device in accordance with embodiments of the present technique.

The live videoconference stream shown in the example of FIG. 3 may be performed within a system such as that shown in FIG. 4, and specifically by a client device 40 which is a client device 40 of the first participant 14 and is configured to receive the live videoconference stream from a server 44. The client device 40, an implementation of which is shown in more detail in FIG. 5, comprises a memory 50 comprising computer-readable instructions, a display 52, and a processor 54, which is communicatively coupled to each of the memory 50 and the display 52. The client device 40 may further comprise a network interface (not shown in the example of FIG. 4), which is configured to connect to one or more networks such as Wi-Fi, wired Ethernet, mobile networks such as LTE or NR, or Bluetooth, in order to communicate with the server 44. The processor 54 may be configured, in accordance with the instructions stored in the memory 50, to receive the foreground images from at least some of the other participants 10A 10B via the server 44, and to present these foreground images overlaid on the common background 22 on the display 52 in accordance with the position mapping 30. This position mapping 30 may also be received from the server 44, which itself may receive the position mapping 30 from a client device 42 of the meeting organiser (or host) of the live videoconference stream as illustrated in the example of FIG. 4. Here, the received position mapping 30 may be used by the client device 40 to place received foreground images on a separately received common background 22, or may be used by the client device 40 to assemble combination foreground and background (i.e. a portion of the background 22) images received from the server as a plurality of subpicture streams during the videoconference. Here, the subpicture streams may be compressed, or may be reduced resolution individual streams, in order to allow for the reception of such streams in a more efficient manner.

Those skilled in the art would appreciate that a client device in accordance with embodiments of the present technique, such as client device 40, may not actually comprise a display 52, but instead may be communicatively coupled to an external display. A client device 40 in this case (and indeed in the case where the client device 40 does comprise a display 52) may comprise an input configured to output signals for display, which are transmitted to the external or internal display 52 for presentation.

The background image may be selected by the meeting organiser, and transmitted by the meeting organiser to the (other) participants of the video conference via the server 44. This common background scene will, as described above, give the participants a sense of shared space, and may be selected by the meeting organiser in order to influence the tone of the meeting (e.g. an office or meeting room location may be selected for serious business meetings, while a beach or pub scene might be selected for a more informal video conference). Alternatively, each user may select their own common background; the consistency in position on the screen would still be assured across all participants based on the position mapping 30.

The foreground images of the participants may be live video streams, but may alternatively be still images, avatars or representations of participants in the cases of users who do not have capability on their chosen devices to share a live video feed, or who for reasons of comfort or privacy, choose not to. The client device of each participant may capture such a live video stream or still image of the participant (or a still image may be selected from a memory of the client device) using a camera or image sensor (or other imaging element) for example, which may be integrated within the client device or otherwise in communication with and controllable by the client device. Capable devices may then segment the head, shoulders, and any other body parts from any background of the still image or live video stream to produce the foreground image. In some arrangements of embodiments of the present disclosure this functionality may be performed by circuitry configured to perform video processing such as edge detection or colour blob analysis. This foreground image (which may be a segmented foreground image or a foreground image overlaid on a transparent background) may then be transmitted to the server for transmission to and display on each of the other participants of the video conference (which may include the organiser of the video conference) over the common background scene and in accordance with the common position mapping. In the case where a participant's device does not have such segmentation capabilities, the whole still image or live video stream may be transmitted to the server, at which the segmentation is performed. Again, in some arrangements of embodiments of the present technique this functionality may be performed by circuitry configured to perform video processing such as edge detection or colour blob analysis.

The position mapping may comprise mapping participants to a position on a grid-like structure, where the background image may be divided (in accordance with a grid) into multiple rows and columns within which the foreground images of the videoconference participants are placed. This grid structure does not necessarily require rows and columns to be aligned with one another; for example for a live videoconference stream comprising seven participants, the grid structure may comprise three columns in a middle row and two columns in an upper and a lower row, where the middle column of the middle row may overlap with both columns in the upper and lower row to ensure participants/foreground images fill the space over the background image more appropriately. The position mapping may also or alternatively involve the use of coordinates, where each participant/foreground image is associated with a set of coordinates of the background image such that the participant/foreground image is located in the same place overlaid on the background image for all of the plurality of participants.

Alternatively, the position mapping may be a tile mapping, where the tile mapping defines an association between each of the foreground images and a different one of a plurality of tiles of the background image. Here, each tile of the background image may be received from one of the other participants via the server as a composite image comprising each tile of the background image and the foreground image to which it is mapped, or each foreground image may be received from the server in isolation from the background tile itself, such that each participant may perform the compositing between foreground image and background tile (in accordance with the tile mapping) locally—where the background image is either received from the meeting organiser via the server or chosen by the participant individually. In some arrangements of embodiments of the present technique a tile may be a portion of a background image. In some arrangements of embodiments of the present technique the tile may be an encoding slice or encoding block of a background image in that it is a portion of an image that is independently decodable from other slices or block in the background image by a decoder such as an H.265 decoder.

Each user may transmit their foreground image and mapped tile of the background image to the server after receiving the common background image and the tile mapping from the meeting organiser via the server, where this foreground image and background tile may be transmitted as a composite image or individually to the server for compositing at the server before onward transmission to the other participants, after the tiles have been arranged by the server with respect to the background in the correct order in accordance with the tile mapping.

A participant may select the tile to which their foreground image is mapped, provided said tile is not already allocated to or selected by another of the participants of the video conference, and will then notify the server of this selection such that the tile mapping can be created (or updated) and shared with the other participants of the video conference. The participant may be able to, in advance of the meeting, select which tile of the background they would like to be mapped onto, for example by dragging an avatar or preview image of themselves into a position on a representation of the background. A participant may wish to be at the centre of the image, to the extent that this is permitted by the meeting organiser with respect to the organisation of positions of other participants such as key speakers. Participants may also, or alternatively, indicate which other participants they would like to be in proximity of, and the server could decide which tiles to allocate to these participant(s) on that basis.

If there are 50 intended participants of the video conference, the image may be segmented into 50 tiles, or slightly more than 50 tiles to allow for late comers or to provide a regular partitioning of the background image according to the number of participants. For example, a prime number of participants which would otherwise allow for only a one-dimensional array of tiles (e.g. 53 participants on 1×53 tiles), may instead cause a partitioning of 9×6=54 tiles with one spare. This example assumes equally sized tiles, but as would be appreciated by those skilled in the art the disclosure is not so limited. If fewer than 50 participants actually join the call, or particularly if a key participant such as a main designated speaker does not show for the video conference, the image may be re-segmented, and a new tile may be sent to each actual participant, again reserving some times tiles for late joiners. Alternatively or additionally, a foreground image may be mapped to two or more adjacent tiles. Alternatively or additionally, the server can unsegment the received tiles and reposition the foreground image on a new tile at the server. That is, one or both of the number of the tiles and the position of each of the tiles may be dynamically changeable by the organiser of the live videoconference stream during the live videoconference stream.

An indication of a number of the tiles and/or an indication of a position of each of the tiles into which the background image is segmented may be received by the first participant from the organiser of the live videoconference stream via the server. Such indications may form part of the tile/position mapping, or may be separate. Here, the position of the tiles mapped to the foreground images of one or more of the plurality of participants who are designated as key speakers of the videoconference or otherwise as important or more vocal participants may be substantially at the centre of the background image. Alternatively, or in addition, the position of the tiles mapped to the foreground images of two or more of the plurality of participants who are designated as key speakers of the videoconference may be positioned in a group on the background image.

The meeting organiser (or indeed the server) may allocate tiles to specific participants so that they appear closer together or further apart from one another. This is shown in FIG. 6A, which shows a second example of a live videoconference stream in which participants are placed over a common background in an order based on a shared position mapping in accordance with embodiments of the present technique.

Figure 6A:
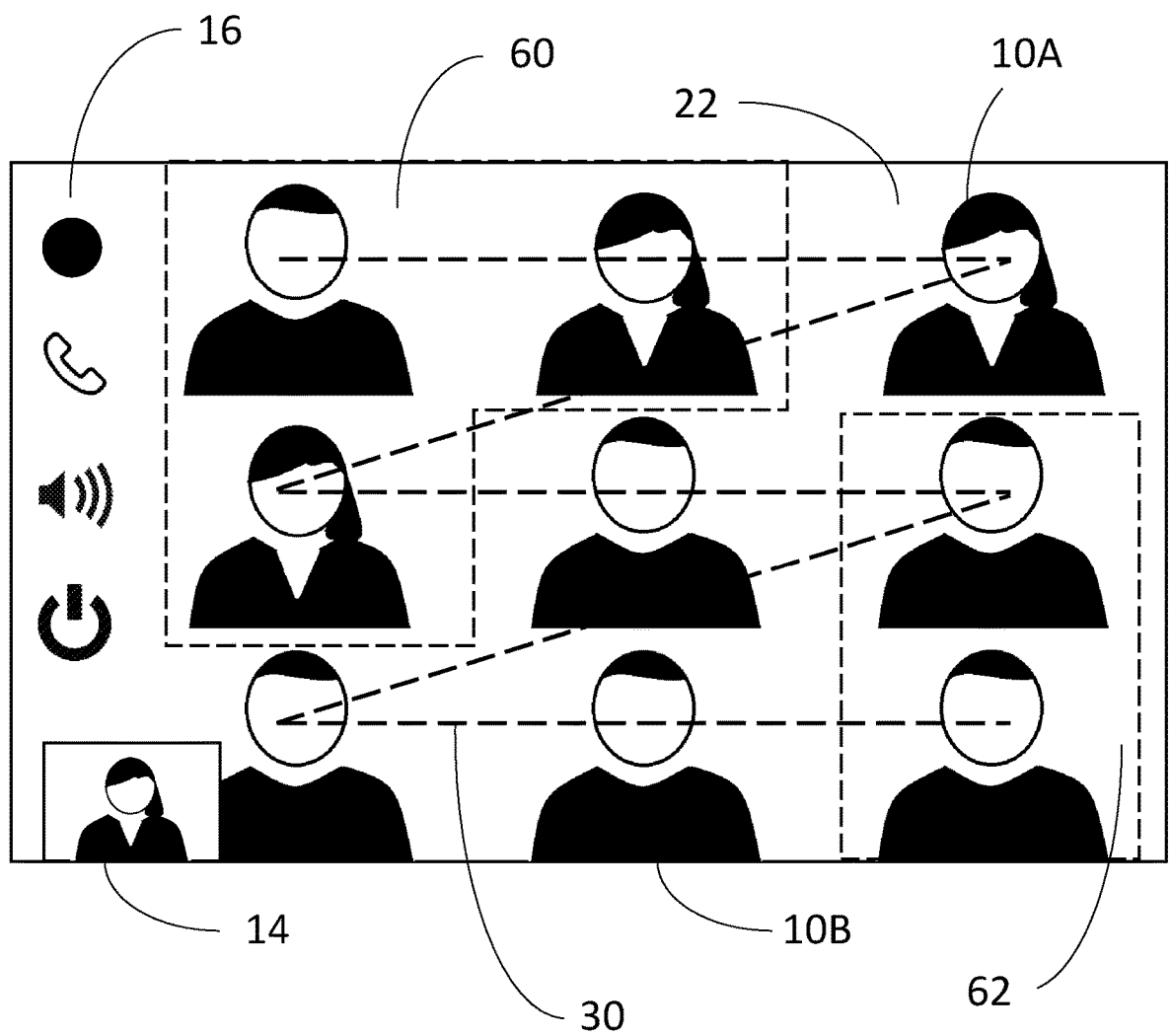
FIGS. 6A to 6C illustrate further examples of a live videoconference stream in which participants are placed over a common background in an order based on a shared position mapping in accordance with embodiments of the present technique.

In the example of FIG. 6A, participants may be grouped on the screen with their colleagues or other associated participants of the video conference. Two groups are shown in the example of FIG. 6A; a first group 60 with three participants, and a second group 62 with two participants. The remaining participants of the video conference call illustrated in the example of FIG. 6A, such as participants 10A and 10B, may not be associated with any other participants of the live videoconference stream in such a way as warrants them being placed in a group, and so such participants can be positioned in any available location on the screen. That is, the plurality of participants may comprise one or more groups of two or more of the plurality of participants, and the tiles mapped to the foreground images of participants forming part of the same group may be positioned in a group on the background image. Such groups may be determined or formed by the server and/or the meeting organiser dependent on, for example, the organisation (employer for example) of the participant. This may be determined by, for example, analysing the domain name of an email address registering the participant to the meeting, or by a LinkedIn or other social media account associated with the participant, and colleagues from a same employer may be clustered together in tiles of the background that will arranged to be adjacent or close to each other. Connected participants in the social network may be arranged adjacent or close to one another. Their degree of separation in the social network, optionally with respect to another entity in the social network such as the meeting organiser or organising company, may determine their positional arrangement. As such, an Application Programming Interface (API) from the social network may be connected, and may provide data to the meeting organiser or to a server. Furthermore, labels or colour coding could be used to show the clusters to the users (both those grouped, and the other participants of the videoconference), and/or clusters may be bordered or appended with company logos, and such things may selected by the server or meeting organiser, or chosen by the grouped users themselves.

At least some embodiments of the present disclosure may provide a method of receiving a live videoconference stream from a server, the live videoconference stream involving a plurality of participants each receiving the live videoconference stream using a client device, the method comprising receiving, by a client device of a first participant of the plurality of participants via the server, a foreground image from at least some of the other participants, and presenting on a display (or outputting for presentation on a display by an external display), by the client device of the first participant, the foreground images from the at least some of the other participants overlaid on a common background image in accordance with a position mapping determined by the server according to information relating to at least some of the plurality of participants, the information being either the domain name of an email address or connection data between participants in respect of a social network. Corresponding client devices, servers and computer programs for, in part, performing this method, are also within scope of the disclosure.

Participants who intend (or are anticipated) to be vocally participant rather than just watchers of the video conference, may be positioned close together on the background, for example based on a history of participation which may be indicated by, for example, a flag or other attribute in data transmitted by a participant when accepting participation in the meeting. Mere watchers may be arranged round the background image periphery. Multiple concentric rings of tiles (or layers of tiles organised in any other suitable fashion) may be determined by the meeting organiser or server, where inner rings are reserved for important or vocal participants, and outer rings are used for quiet or late-arriving participants. Such outer rings may not initially be displayed over the background, while foreground images may be zoomed out on the background to show the outer rings as and when more participants join in order to keep key or vocal participants both centrally located and relatively static. The meeting organiser or server may cluster vocal users together in a dynamic fashion during the video conference, and reallocate the tiles on this basis at reasonable intervals where the topic of discussion lasts for some time or the number of participants changes.

Figure 6B:
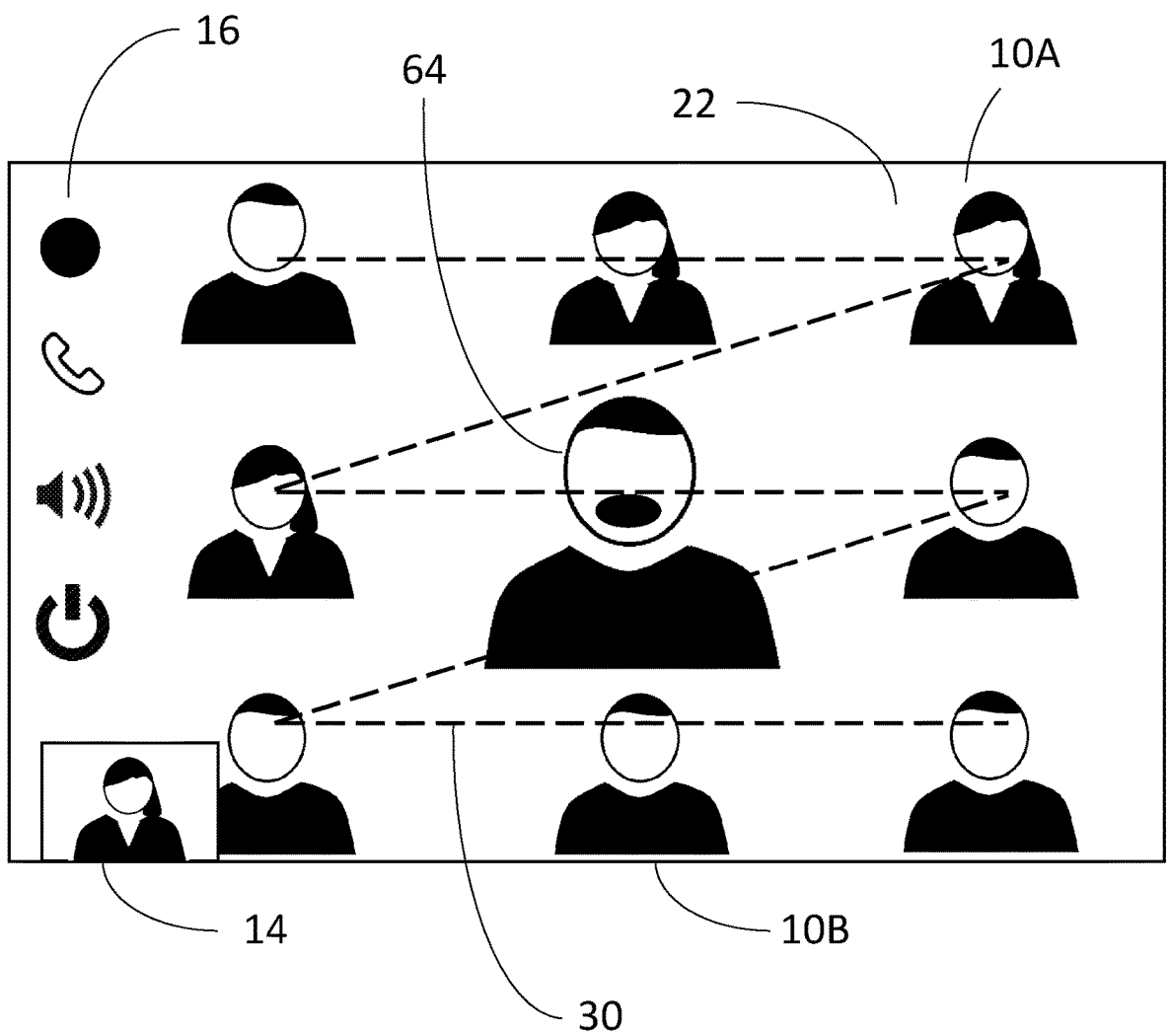

In some implementations of embodiments of the present technique, the tiles (or regions) of the background image may be uniformly sized, such as in the examples shown in FIGS. 1, 2A, 2B, 2C, 3, and 6A. However, in other implementations of embodiments of the present technique, the tiles (or regions) of the background image may be non-uniformly sized. FIG. 6B shows a third example of a live videoconference stream in which participants are placed over a common background in an order based on a shared position mapping in accordance with embodiments of the present technique. Here, it is illustrated how regions or tiles may be of different sizes. In the example of FIG. 6B, the region containing the foreground image of participant 64 is larger than the regions containing the foreground images of the other participants, and more centrally located, because participant 64 is the primary speaker of the videoconference, while other participants are smaller and more peripherally located.

Hence, as described above, the tiles mapped to the foreground images of one or more of the plurality of participants who are designated as key speakers of the videoconference may be larger than the tiles mapped to the foreground images of one or more of the plurality of participants who are not designated as key speakers. Alternatively, or in addition, the size of each tile may be based on a size of the foreground image mapped to the tile; that is, how close the participant is to the camera may determine to which size tile the participant is mapped. This may allow a video conference organiser, by circuitry, to keep the size of each participant in proportion to each other, so that participants who sit further from their camera do not appear smaller on the screen.

The background image may be a widescreen or a super-widescreen image, which may not be fully displayed on client devices of some participants (for example, those using old non-widescreen equipment or devices such as smartphones). Here, the background image may rotate and/or scroll such that the tile mapped to the foreground image of a participant who is presently speaking is positioned substantially at the centre of the background image. Here, it may be preferable in at least some implementations of the present technique that the key or most common speakers of the video conference are placed closer together to minimise the amount of scrolling or rotating required to move between them, and as such to reduce any nauseous feelings of motion experienced by participants of the live video conference call. The background image may additionally be selectively rotated and/or scrolled by a participant in order to view certain other users of such a participant's choice. That is, the background image may be scrollable for one or more of the plurality of participants who are presenting the live videoconference stream on a display having a lower aspect ratio than the background image and/or for one or more of the plurality of participants who are presenting the live videoconference stream on a display having a size below a threshold size.

Figure 6C:
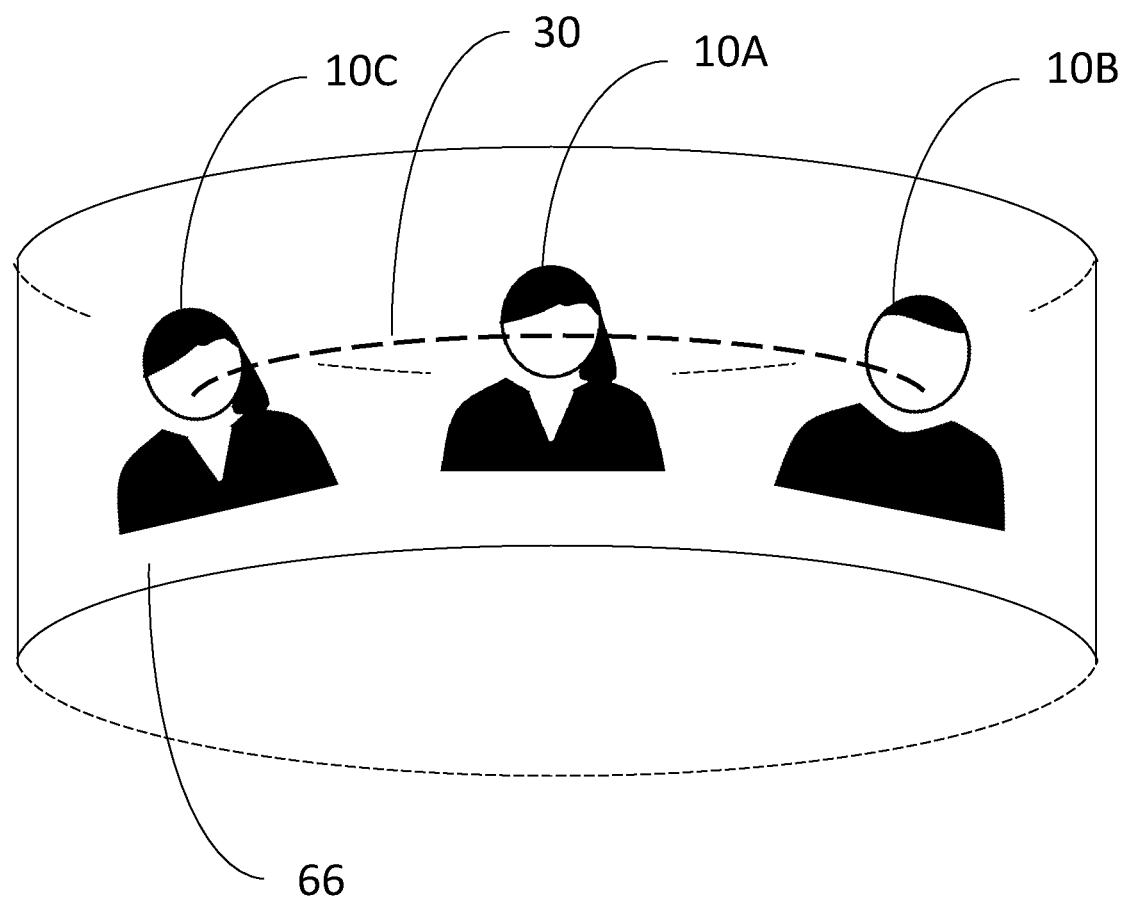

Alternatively, the background image may be a three-dimensional image or 360 degree image. Here, tiles may be curved tiles (or may be pseudo-flat tiles) with foreground images of participants being corrected for distortion, and again the background image may rotate and/or scroll (and be selectively rotated and/or scrolled by a participant) such that the tile mapped to the foreground image of a participant who is presently speaking is positioned substantially at the centre of the background image. FIG. 6C shows a fourth example of a live videoconference stream in which participants are placed over a common background in an order based on a shared position mapping in accordance with embodiments of the present technique. Here, it is illustrated how a 360 degree or three-dimensional videoconference may be held, with participants 10A, 10B, 10C placed on curved or pseudo-flat tiles along what can be imagined as the inside surface of a drum. The curved or pseudo-flat tiles of participants 10A, 10B, 10C may rotate or shift across the screen depending on who is speaking. This may be controllable by a participant using a smartphone or tablet like device comprising a gyroscopic feature, such as a built in gyroscopic sensor, by moving, tilting or rotating the device, and may perform a certain action (e.g. pointing the device upwards) to snap the current view of the screen to the present speaker of the videoconference, or for example by touching a GUI element on the screen such that the view is snapped to, and the user then can move the smartphone or tablet a more comfortable or natural position, retaining the selected view. Alternatively, or in addition, arrows may be displayed at the periphery of the screen to identify a present position of the current speaker with respect to a present view on the device, and the participant may physically rotate or scroll with one of a click or touch gesture or the like in accordance with the direction of the displayed arrows to locate the speaker.

Though embodiments of the present technique have been described largely by way of the example apparatus and systems shown in FIGS. 3 to 6C, it would be clear to those skilled in the art that they could be equally applied to other systems to those described herein. For example, different units or circuitries may be included than those which are shown and described, or the steps of described methods may be performed in various orders or delegated in a different way between the units involved.

As used herein, the terms "a" or "an" shall mean one or more than one. The term "plurality" shall mean two or more than two. The term "another" is defined as a second or more. The terms "including" and/or "having" are open ended (e.g., comprising). Reference throughout this document to "one embodiment", "some embodiments", "certain embodiments", "an embodiment" or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation. The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

The following numbered paragraphs provide further example aspects and features of the present technique:

Paragraph 1. A method of receiving a live videoconference stream from a server, the live videoconference stream involving a plurality of participants each receiving the live videoconference stream using a client device, the method comprising receiving, by a client device of a first participant of the plurality of participants via the server, a foreground image from the client devices of at least some of the other participants, and outputting for display, by the client device of the first participant, the foreground images from the at least some of the other participants overlaid on a common background image in accordance with a position mapping received from a client device of an organiser of the live videoconference stream via the server, wherein the position mapping is for distribution via the server to the client devices of all of the plurality of participants.

Paragraph 2. A method according to Paragraph 1, wherein the background image is selected by the videoconference organiser and is received by the client device of the first participant from the videoconference organiser via the server.

Paragraph 3. A method according to Paragraph 1 or Paragraph 2, wherein one or more of the foreground images are live video streams.

Paragraph 4. A method according to any of Paragraphs 1 to 3, comprising
transmitting, by the client device of the first participant to the server for transmission by the server to the client devices of each of the plurality of other participants, a foreground image of the first participant.

Paragraph 5. A method according to any of Paragraphs 1 to 4, wherein the position mapping is a tile mapping, the tile mapping defining an association between each of the foreground images and a different one of a plurality of tiles of the background image.

Paragraph 6. A method according to Paragraph 5, comprising
selecting, by the first participant, the first tile from among those of the plurality of tiles which have not already been selected by others of the plurality of participants.

Paragraph 7. A method according to Paragraph 5 or Paragraph 6, wherein each tile of the background image is received from one of the other participants via the server as a composite image comprising each tile of the background image and the foreground image to which it is mapped.

Paragraph 8. A method according to Paragraph 7, comprising
transmitting, by the client device of the first participant to the server for transmission by the server to each of the plurality of other participants, a first tile of the background image, the first tile of the background image being mapped to the foreground image of the first participant.

Paragraph 9. A method according to Paragraph 8, comprising
transmitting, by the client device of the first participant to the server for transmission by the server to each of the plurality of other participants, the foreground image of the first participant and the first tile of the background image together as a composite image.

Paragraph 10. A method according to any of Paragraphs 7 to 9, wherein the transmitting the foreground image of the first participant comprises
capturing, by the client device of the first participant, a still image or a live video stream of the first participant,
segmenting, by the client device of the first participant, a portion of the still image or the live video stream from a background of the still image or the live video stream, the portion being the foreground image of the first participant, and
transmitting, by the client device of the first participant to the server for transmission by the server to each of the plurality of other participants, the segmented portion of the still image or the live video stream as the foreground image of the first participant.

Paragraph 11. A method according to any of Paragraphs 7 to 10, wherein the transmitting the foreground image of the first participant comprises
capturing, by the client device of the first participant, a still image or a live video stream of the first participant, and
transmitting, by the client device of the first participant to the server for segmentation of a portion of the still image or the live video stream from a background of the still image or the live video stream, the portion being the foreground image of the first participant and being for subsequent transmission by the server to each of the plurality of other participants.

Paragraph 12. A method according to any of Paragraphs 5 to 11, wherein an indication of a number of the tiles and/or an indication of a position of each of the tiles into which the background image is segmented are received by the client device of the first participant from the organiser of the live videoconference stream via the server.

Paragraph 13. A method according to Paragraph 12, wherein the position of the tiles mapped to the foreground images of one or more of the plurality of participants who are designated as key speakers of the videoconference is substantially at the centre of the background image.

Paragraph 14. A method according to Paragraph 12 or Paragraph 13, wherein the position of the tiles mapped to the foreground images of two or more of the plurality of participants who are designated as key speakers of the videoconference are positioned in a cluster on the background image.

Paragraph 15. A method according to any of Paragraphs 12 to 14, wherein the plurality of participants comprises one or more groups of two or more of the plurality of participants, and wherein the tiles mapped to the foreground images of participants forming part of the same group are positioned in a cluster on the background image.

Paragraph 16. A method according to any of Paragraphs 12 to 15, wherein one or both of the number of the tiles and the position of each of the tiles is dynamically changeable by the organiser of the live videoconference stream during the live videoconference stream.

Paragraph 17. A method according to any of Paragraphs 5 to 16, wherein the tiles are uniformly sized.

Paragraph 18. A method according to any of Paragraphs 5 to 17, wherein the tiles are non-uniformly sized.

Paragraph 19. A method according to Paragraph 18, wherein the tiles mapped to the foreground images of one or more of the plurality of participants who are designated as key speakers of the videoconference are larger than the tiles mapped to the foreground images of one or more of the plurality of participants who are not designated as key speakers.

Paragraph 20. A method according to Paragraph 18 or Paragraph 19, wherein the size of each tile is based on a size of the foreground image mapped to the tile.

Paragraph 21. A method according to any of Paragraphs 5 to 20, wherein the background image is a 360 degree image, and wherein the tiles are curved tiles.

Paragraph 22. A method according to Paragraph 21, wherein the background image rotates and/or scrolls such that the tile mapped to the foreground image of a participant who is presently speaking is positioned substantially at the centre of the background image.

Paragraph 23. A method according to Paragraph 22, wherein the background image may be selectively rotated and/or scrolled by the first participant.

Paragraph 24. A method according to any of Paragraphs 1 to 23, wherein the background image is a three-dimensional image.

Paragraph 25. A method according to any of Paragraphs 1 to 24, wherein the background image is a widescreen or a super-widescreen image.

Paragraph 26. A method according to any of Paragraphs 1 to 25, wherein the background image is scrollable for one or more of the plurality of participants who are presenting the live videoconference stream on a display having a lower aspect ratio than the background image and/or for one or more of the plurality of participants who are presenting the live videoconference stream on a display having a size below a threshold size.

Paragraph 27. A first client device configured to receive a live videoconference stream from a server, the live videoconference stream involving a plurality of participants each receiving the live videoconference stream using a client device, the first client device being a client device of a first of the plurality of participants and comprising
 memory comprising computer-readable instructions,
 an interface configured to output signals for display, and
 a processor configured, in accordance with the instructions stored in the memory,
  to receive a foreground image from at least some of the other participants via the server, and
  to output for display the foreground images from the at least some of the other participants overlaid on a common background image in accordance with a position mapping received from a client device of an organiser of the live videoconference stream via the server, wherein the position mapping is for distribution via the server to the client devices all of the plurality of participants.

Paragraph 28. A computer program for causing a computer when executing the computer program to perform the method according to any of Paragraphs 1 to 26.

Paragraph 29. A method of organising a live videoconference stream involving a plurality of participants, the live videoconference stream being receivable by client devices of each of the plurality of participants from a server, the method comprising
 determining a position mapping for the live videoconference stream, the position mapping being for distribution to the client devices of all of the plurality of participants and defining an association between a foreground image of each of the plurality of participants and a position on a common background image of the live videoconference stream, the foreground images of each of the plurality of participants being overlaid on the common background image during the live videoconference stream, and
 transmitting, by a client device, the position mapping to the server.

Paragraph 30. A method according to Paragraph 29, comprising
 selecting the background image, and
 transmitting, by the client device, the background image to the server for transmission to each of the plurality of participants.

Paragraph 31. A method according to Paragraph 29 or Paragraph 30, wherein the position mapping is a tile mapping, the tile mapping defining an association between each of the foreground images and a different one of a plurality of tiles of the background image.

Paragraph 32. A method according to Paragraph 31, comprising
 transmitting, by the client device to the server for transmission to the client devices of each of the plurality of participants, an indication of a number of the tiles and/or an indication of a position of each of the tiles into which the background image is segmented.

Paragraph 33. A method according to Paragraph 32, comprising
 selecting the position of the tiles mapped to the foreground images of one or more of the plurality of participants who are designated as key speakers of the videoconference to be substantially at the centre of the background image.

Paragraph 34. A method according to Paragraph 32 or 33, comprising
 selecting the position of the tiles mapped to the foreground images of two or more of the plurality of participants who are designated as key speakers of the videoconference to be positioned in a cluster on the background image.

Paragraph 35. A method according to any of Paragraphs 32 to 34, wherein the plurality of participants comprises one or more groups of two or more of the plurality of participants, and wherein the method comprises
 selecting the position of the tiles mapped to the foreground images of participants forming part of the same group to be positioned in a cluster on the background image.

Paragraph 36. A method according to any of Paragraphs 32 to 35, comprising
 dynamically changing one or both of the number of the tiles and the position of each of the tiles during the live videoconference stream.

Paragraph 37. A second client device configured to organise a live videoconference involving a plurality of participants, the live videoconference stream being receivable by client devices of each of the plurality of participants from a server, the second client device comprising
 a memory comprising computer-readable instructions, and
 a processor configured, in accordance with the instructions stored in the memory,
  to determine a position mapping for the live videoconference stream, the position mapping being for distribution to the client devices of all of the plurality of participants and defining an association between a foreground image of at least some of the plurality of participants and a position on a common background image of the live videoconference stream, the foreground images of the at least some of the plurality of participants being overlaid on the common background image during the live videoconference stream, and
  to transmit the position mapping to the server.

Paragraph 38. A computer program for causing a computer when executing the computer program to perform the method according to any of Paragraphs 29 to 36.

Paragraph 39. A method of operating a server for hosting a live videoconference stream involving a plurality of participants, the live videoconference stream being receivable by client devices of each of the plurality of participants from the server, the method comprising
 receiving a foreground image from the client devices of at least some of the plurality of participants, and
 receiving a position mapping of the live videoconference stream from a client device of an organiser of the live videoconference stream, the position mapping being for distribution to the client devices of all of the plurality of participants and defining an association between a foreground image of each of the at least some of the plurality of participants and a position on a common background image of the live videoconference stream, transmitting, to the client devices each of the plurality of participants, the foreground image of the at least some of the plurality of participants for presentation by the client devices of each of the plurality of participants overlaid on the common background image in accordance with the position mapping.

Paragraph 40. A method according to Paragraph 39, wherein the position mapping is a tile mapping, the tile mapping defining an association between each of the foreground images and a different one of a plurality of tiles of the background image.

Paragraph 41. A method according to Paragraph 40, wherein the foreground image received from one or more of the at least some of the plurality of participants is received as a composite image comprising each tile of the background image and the foreground image to which it is mapped.

Paragraph 42. A method according to Paragraph 40 or Paragraph 41, wherein the foreground image received from one or more of the at least some of the plurality of participants is received as a portion of a still image or a live video stream captured by the participant, the portion having been segmented by the participant from a background of the still image or the live video stream.

Paragraph 43. A method according to any of Paragraphs 40 to 42, wherein the foreground image received from one or more of the at least some of the plurality of participants is received as a still image or a live video stream captured by the participant, and the method comprises, before transmitting the foreground image of the one or more of the at least some participants to the others of the plurality of participants,
segmenting a portion of the still image or the live video stream from a background of the still image or the live video stream.

Paragraph 44. A server apparatus configured to host a live videoconference stream involving a plurality of participants, the live videoconference stream being receivable by client devices of each of the plurality of participants from the server, the server apparatus comprising
a memory comprising computer-readable instructions, and
a processor configured, in accordance with the instructions stored in the memory,
to receive a foreground image from the client devices of at least some of the plurality of participants, and
to receive a position mapping of the live videoconference stream from a client device of an organiser of the live videoconference stream, the position mapping being for distribution to the client devices of all of the plurality of participants and defining an association between a foreground image of each of the plurality of participants and a position on a common background image of the live videoconference stream,
to transmit, to the client devices of each of the plurality of participants, the foreground image of the at least some of the plurality of participants for presentation by the client devices of each of the plurality of participants overlaid on the common background image in accordance with the position mapping.

Paragraph 45. A computer program for causing a computer when executing the computer program to perform the method according to any of Paragraphs 39 to 43.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

What is claimed is:

1. A method of receiving a live videoconference stream from a server, the live videoconference stream involving a plurality of participants each receiving the live videoconference stream using a client device, the method comprising
receiving, by a client device of a first participant of the plurality of participants via the server, a foreground image from the client devices of at least some of the other participants, and
outputting for display, by the client device of the first participant, the foreground images from the at least some of the other participants overlaid on a common background image in accordance with a position mapping received from a client device of an organiser of the live videoconference stream via the server, wherein the position mapping is for distribution via the server to the client devices of all of the plurality of participants; and
wherein the position mapping is a tile mapping, the tile mapping defining an association between each of the foreground images and a different one of a plurality of tiles of the background image.

2. The method according to claim 1, wherein the background image is selected by the videoconference organiser and is received by the client device of the first participant from the videoconference organiser via the server.

3. The method according to claim 1, wherein one or more of the foreground images are live video streams.

4. The method according to claim 1, comprising transmitting, by the client device of the first participant to the server for transmission by the server to the client devices of each of the plurality of other participants, a foreground image of the first participant.

5. The method according to claim 1, comprising selecting, by the first participant, the first tile from among those of the plurality of tiles which have not already been selected by others of the plurality of participants.

6. The method according to claim 1, wherein each tile of the background image is received from one of the other participants via the server as a composite image comprising each tile of the background image and the foreground image to which it is mapped.

7. The method according to claim 6, comprising transmitting, by the client device of the first participant to the server for transmission by the server to each of the plurality of other participants, a first tile of the background image, the first tile of the background image being mapped to the foreground image of the first participant.

8. The method according to claim 7, comprising transmitting, by the client device of the first participant to the server for transmission by the server to each of the plurality of other participants, the foreground image of the first participant and the first tile of the background image together as a composite image.

9. The method according to claim 6, wherein the transmitting the foreground image of the first participant comprises
capturing, by the client device of the first participant, a still image or a live video stream of the first participant,
segmenting, by the client device of the first participant, a portion of the still image or the live video stream from a background of the still image or the live video stream, the portion being the foreground image of the first participant, and
transmitting, by the client device of the first participant to the server for transmission by the server to each of the plurality of other participants, the segmented portion of the still image or the live video stream as the foreground image of the first participant.

10. The method according to claim 6, wherein the transmitting the foreground image of the first participant comprises
capturing, by the client device of the first participant, a still image or a live video stream of the first participant, and
transmitting, by the client device of the first participant to the server for segmentation of a portion of the still image or the live video stream from a background of the still image or the live video stream, the portion being the foreground image of the first participant and being for subsequent transmission by the server to each of the plurality of other participants.

11. The method according to claim 1, wherein an indication of a number of the tiles and/or an indication of a position of each of the tiles into which the background image is segmented are received by the client device of the first participant from the organiser of the live videoconference stream via the server.

12. The method according to claim 11, wherein the position of the tiles mapped to the foreground images of one or more of the plurality of participants who are designated as key speakers of the videoconference is substantially at the centre of the background image.

13. The method according to claim 11, wherein the position of the tiles mapped to the foreground images of two or more of the plurality of participants who are designated as key speakers of the videoconference are positioned in a cluster on the background image.

14. The method according to claim 11, wherein the plurality of participants comprises one or more groups of two or more of the plurality of participants, and wherein the tiles mapped to the foreground images of participants forming part of the same group are positioned in a cluster on the background image.

15. The method according to claim 11, wherein one or both of the number of the tiles and the position of each of the tiles is dynamically changeable by the organiser of the live videoconference stream during the live videoconference stream.

16. The method according to claim 5, wherein the tiles are non-uniformly sized.

17. A first client device configured to receive a live videoconference stream from a server, the live videoconference stream involving a plurality of participants each receiving the live videoconference stream using a client device, the first client device being a client device of a first of the plurality of participants and comprising
memory comprising computer-readable instructions,
an interface configured to output signals for display, and
a processor configured, in accordance with the instructions stored in the memory,
to receive a foreground image from at least some of the other participants via the server, and
to output for display the foreground images from the at least some of the other participants overlaid on a common background image in accordance with a position mapping received from a client device of an organiser of the live videoconference stream via the server, wherein the position mapping is for distribution via the server to the client devices all of the plurality of participants; and
wherein the position mapping is a tile mapping, the tile mapping defining an association between each of the foreground images and a different one of a plurality of tiles of the background image.

18. A non-transitory computer readable medium storing computer code that, when executed by a computer, cause the computer to perform the method according to claim 1.

19. A method of operating a server for hosting a live videoconference stream involving a plurality of participants, the live videoconference stream being receivable by client devices of each of the plurality of participants from the server, the method comprising
receiving a foreground image from the client devices of at least some of the plurality of participants, and
receiving a position mapping of the live videoconference stream from a client device of an organiser of the live videoconference stream, the position mapping being for distribution to the client devices of all of the plurality of participants, defining an association between a foreground image of each of the at least some of the plurality of participants and a position on a common background image of the live videoconference stream and the position mapping being a tile mapping, the tile mapping defining an association between each of the foreground images and a different one of a plurality of tiles of the background image,
transmitting, to the client devices by circuitry each of the plurality of participants, the foreground image of the at least some of the plurality of participants for presentation by the client devices of each of the plurality of participants overlaid on the common background image in accordance with the position mapping.

* * * * *